United States Patent
Smith

(10) Patent No.: US 8,549,661 B2
(45) Date of Patent: Oct. 1, 2013

(54) APPARATUS FOR PERFORMING MAGNETIC RESONANCE FORCE MICROSCOPY ON LARGE AREA SAMPLES

(75) Inventor: Doran Smith, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/361,223

(22) Filed: Jan. 30, 2012

(65) Prior Publication Data

US 2013/0198914 A1   Aug. 1, 2013

(51) Int. Cl.
  *G01Q 60/08*   (2010.01)
  *G01Q 60/00*   (2010.01)

(52) U.S. Cl.
  USPC .......... 850/43; 850/6; 850/9; 850/30; 850/53; 324/218; 324/300; 324/307; 324/309

(58) Field of Classification Search
  USPC ............... 850/6, 9, 30, 43, 53; 324/218, 300, 324/307, 309
  See application file for complete search history.

(56) References Cited

U.S. PATENT DOCUMENTS

| | | | |
|---|---|---|---|
| 5,266,896 A | | 11/1993 | Rugar et al. |
| 5,585,722 A | * | 12/1996 | Hosoki et al. ............... 324/318 |
| 5,856,672 A | * | 1/1999 | Ried ............................. 850/9 |
| 6,181,131 B1 | * | 1/2001 | Bruland et al. ............. 324/300 |
| 6,676,813 B1 | | 1/2004 | Pelekhov et al. |
| 6,683,451 B1 | * | 1/2004 | Moore et al. ................ 324/218 |
| 6,836,112 B2 | | 12/2004 | Hennessy |
| 2011/0035849 A1 | * | 2/2011 | Finlan et al. ................... 850/6 |
| 2011/0271411 A1 | * | 11/2011 | Rassier et al. .................. 850/6 |

OTHER PUBLICATIONS

"An Optimal Magnetic Tip Configuration for Magnetic-Resonance Force Microscopy of Microscale Buried Features", John A. Marohn and Raul Fainchtein, John Hopkins University, Applied Physics Laboratory, Laurel MD, and Doran D. Smith, U.S. Army Research Laboratories, Adelphia, MD, vol. 73, No. 25, Dec. 21, 1998, pp. 3778-3780.

"Detailed Description of a Compact Cryogenic Magnetic Resonance Force Microscope", Doran D. Smith and John A. Marohn, U.S Army Research Laboratory, Adelphi, MD and Center for Superconductivity Research. Department of Physics, University of Maryland, College Park, MD, and Lee E. Harrell, Department of Physics, United States Military Academy, West Point, NY, vol. 72, No. 4 Apr. 2001, pp. 2080-2099.

"Millikelvin Thermal Conductance Measurements of Compact Rigid Thermal Isolation Joints Using Sapphire-Saphire Contacts, and of Caper and Beryllium-Copper Demountable Thermal Contacts", Dan Bintley, Adam Woodcraft and Fred Gannaway, Cardiff School of physics and Astronomy, Cardiff University, UK, Jul. 20, 2007, 9 pages.

(Continued)

*Primary Examiner* — David A Vanore
(74) *Attorney, Agent, or Firm* — Alan I. Kalb

(57) ABSTRACT

An apparatus for performing magnetic resonance force microscopy on one or more large area samples comprising a base plate, one or more heat sink plates coupled to the base plate, one or more suspension mechanisms coupled to the base plate and the heat sink plates, a probe head suspended from the one or more suspension mechanisms for scanning the one or more samples and a sample cylinder comprising a sample stage coupled to the probe head for sample positioning and an outer drum for isolating the sample stage.

14 Claims, 3 Drawing Sheets

(56) References Cited

OTHER PUBLICATIONS

"Thermal Design of the SCUBA-2 Instrument Detector State and Enclosure", Adam Woodcraft, Fred Gannaway, David Gostick and Dan Bintley, School of Physics and Astronomy, University of Wales, Cardiff, UK, UK Asronomy Technology Centre, Royal Observatory, Edinburgh, UK, 9 pages, Oct. 8, 2004.

Rugar, D, H J Mamin, and P Guethner. "Improved fiber-optic interferometer for atomic force microscopy." Applied Physics Letters 55.25 (1989): 2588.

* cited by examiner

APPARATUS FOR PERFORMING MAGNETIC RESONANCE FORCE MICROSCOPY ON LARGE AREA SAMPLES

GOVERNMENT INTEREST

The invention described herein may be manufactured, used and licensed by or for the U.S. Government.

FIELD OF INVENTION

Embodiments of the present invention generally relate to magnetic imaging and, more particularly, to an apparatus for performing magnetic resonance force microscopy on large area samples.

BACKGROUND OF THE INVENTION

Magnetic resonance force microscopy (MRFM) is an imaging technique that acquires magnetic resonance images (MRI) at nanometer scales, and possibly at atomic scales in the future. An MRFM system comprises a probe coupled to an interferometer. The probe applies a magnetic field to a sample and measures variations in a resonant frequency of the probe. The resonant frequency variations are indicative of the tomography of the sample. More specifically an MRFM probe comprises a cantilever tipped with a ferromagnetic (for example, iron cobalt) particle to resonate as the spin of electrons in the particles of a sample are reversed. There is a background magnetic field generated by a background magnetic field generator which creates a gradient field in the sample. As the ferromagnetic tip moves close to the sample, the atoms' nuclear spins become attracted to the tip and generate a small force on the cantilever. Using an RF magnetic field applied by an RF antenna, the spins are then repeatedly flipped, causing the cantilever to oscillate in a synchronous motion (i.e. a resonant frequency). When the cantilever oscillates, the magnetic particle magnetic moment remains parallel to the background magnetic field, and thus it experiences no torque. The displacement of the cantilever is measured with an interferometer (laser beam) to create a series of 2-D images of the sample, which are combined to generate a 3-D image. Often, audio vibrations in the experimental environment where the probe sits cause unwanted inaccuracies in the measurements and cause malfunction of components in the MRFM system, distorting the displacements of the cantilever and introducing errors in the interferometer readings. This causes the 2D and 3D images of the sample to be inaccurate. In addition, current MRFM systems do not allow a user to easily disconnect various portions of the system or for rapid sample exchange to be performed easily and conveniently.

Therefore, there is a need in the art for an apparatus for performing magnetic resonance force microscopy on large area samples allowing for modularity, rapid sample exchange and vibration isolation.

BRIEF SUMMARY OF THE INVENTION

Embodiments of the present invention relate to an apparatus for performing magnetic resonance force microscopy on one or more large area samples comprising a base plate; one or more heat sink plates coupled to the base plate; one or more suspension mechanisms coupled to the base plate and the heat sink plates; a probe head suspended from the one or more suspension mechanisms for scanning the one or more samples; and a sample cylinder comprising a sample stage coupled to the probe head for sample positioning and an outer drum for isolating the sample stage from an external environment.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Embodiments of the present invention comprise an apparatus for performing magnetic resonance force microscopy on large area samples. The apparatus uses a geometry known as Springiness Preservation by Aligning Magnetization (SPAM). By adopting the SPAM geometry and using a novel probe geometry, accurate scanning of large area samples is achieved. The heat generated by the RF circuitry and the heat sinking of wires is isolated while keeping the rest of the probe cool. Exemplary embodiments of the present invention also provide rapid sample exchange using a modular design, uniform technique for storage of extra optical fiber, and connectors for easy probe assembly and disassembly and use of three-dimensional interferometers to determine relative sample-to-magnetic sensor position. In addition, vibration isolation is achieved using springs to couple a base plate and the probe head components.

Figure 1:
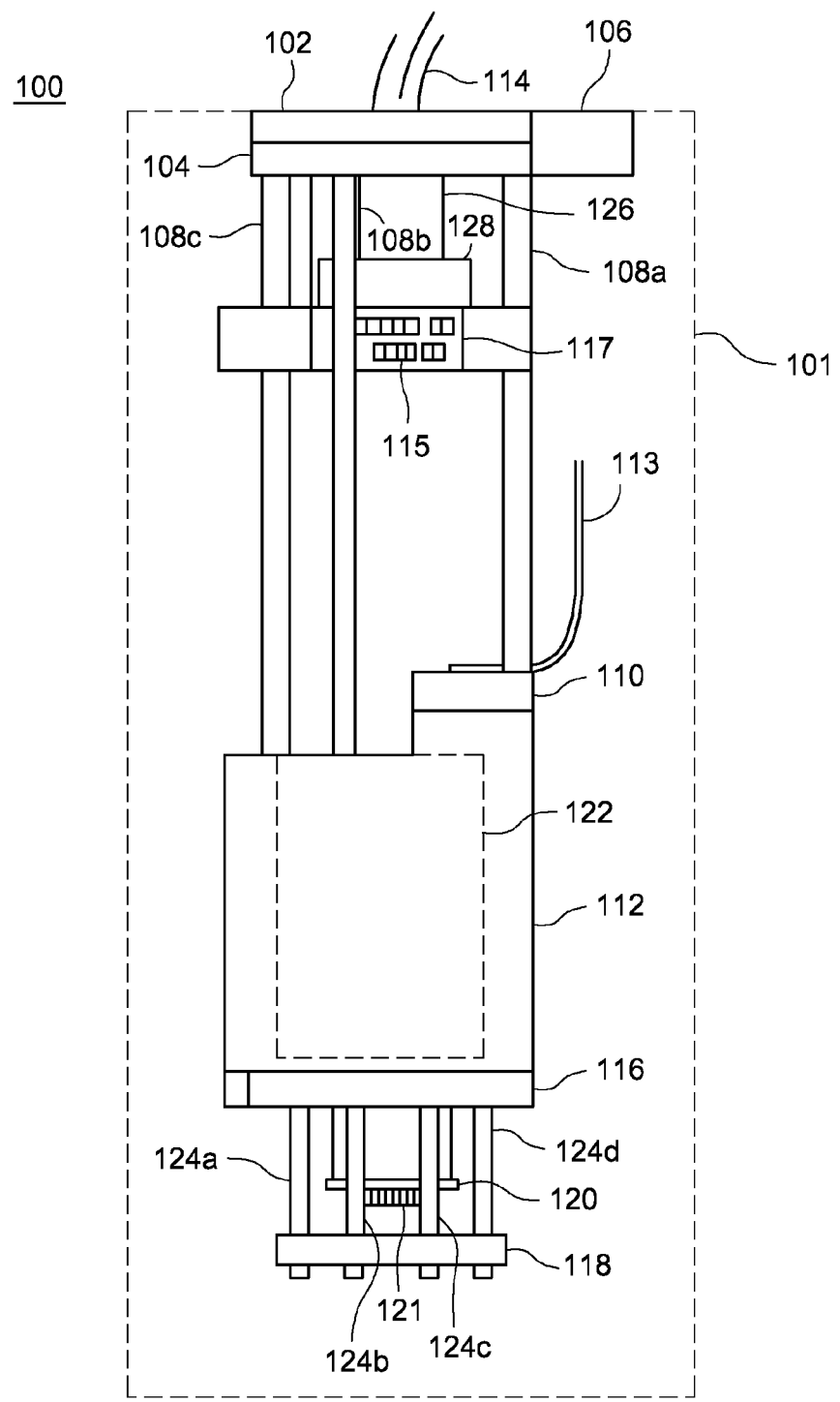
FIG. 1 is a diagram of a magnetic resonance force microscopy (MRFM) apparatus in accordance with exemplary embodiments of the present invention.

FIG. 1 is a diagram of a magnetic resonance force microscopy (MRFM) apparatus 100 in accordance with exemplary embodiments of the present invention. The MRFM apparatus 100 comprises a base or mechanical ground 102 from which the components of the probe head are suspended. The MRFM apparatus 100 further comprises thermal heat sinks 104 and 106 for conducting heat from the probe head. In an exemplary embodiment, heat sink 104 conducts heat generated by the radio-frequency (RF) circuitry from the MRFM apparatus 100 and heat sink 106 conducts heat from the rest of the MRFM apparatus 100. Springs 108a, 108b, 108c provide vibration isolation for a probe head from the vibrations in the base of support at base 102. The present invention does not limit the number of springs to three as depicted in FIG. 1 and other embodiments have more or less springs. Spring 108a is coupled to a probe head plate 110, where the main probe head components (shown in FIG. 2) are mounted. Optical fiber 113 measures small displacements of the probe components shown in FIG. 2. Springs 108a, 108b and 108c are also coupled to the cylinder 112 used to hold the probe head plate 110 onto the cylinder base plate 116.

In an exemplary embodiment, a Teflon® rod is fitted at spring anchor points designed to be a friction fit. In other exemplary embodiments, polyethylene string, e.g. dental floss, is used at the anchor points between the springs and plates for preventing the propagation of sound waves and other vibration through the springs. The impedance mismatch between the metal and the strings reflects sound waves back into the metal, keeping them from being absorbed into the probe head. Polyethylene string also facilitates applying different tensions in the various springs 108a, 108b and 108c allowing the probe head to hang level with the base plate 102 so the probe head does not touch the vacuum can body 101 of the apparatus 100. A sample positioning stage 122 resides on cylinder base plate 116, for holding a sample to be scanned. According to an exemplary embodiment of the present invention, the sample positioning stage 122 is a three-dimensional positioning stage known in the art as an Attocube® stack.

In an exemplary embodiment, cylinder 112 is drilled with several holes to increase stiffness and resonant frequency, thus reducing vibrations. Other parts of the probe head are also subject to similar design techniques. Electrical wires 114 for powering the electrical components of the probe head are connected to contacts 115 on the contact plate 117. The contact plate 117 dissipates heat and isolates the dissipated heat from the other parts of the MRFM apparatus 100. Circuit board 120 also has electrical connectors 121 for powering components of the stage head and to make disassembly and removal of sample stage 122 simple. Base plate 118 is a high conductivity metal ring made of copper, in an exemplary embodiment, attached to lower base plate 116 via screws 124a, 124b, 124c and 124d. In other embodiments, the base plate 118 is attached to the base plate 116 via other securing mechanisms such as pins, clamps and the like. In other embodiments, the base plate 118 is shaped like a ring, square, rectangle or the like made of a high conductivity metal like copper or aluminum. The base plate 118 acts as an eddy current damping ring to suppress any vibrations from the external environment from affecting the probe head. The base plate 118 is especially useful in an embodiment where the MRFM apparatus 100 is made out of stainless steel or titanium. In an embodiment where the MRFM apparatus 100 is made of reasonably pure aluminum or copper, the base plate 118 is not required. In an embodiment where the MRFM apparatus 100 is sufficiently well-isolated from vibration, the Eddy Current damping provided by base plate 118 may not be required.

The assembly consisting of contact plate 117 and heat sinks 126 and 128 are used to heat sink electrical wires 114 coming down from the top of the MRFM apparatus 100. The top of the wires 114 are room temperature, but the bottom end of the wire (at the base head plate 110) must be approximately 4 K. This is accomplished by having the wires 114 heat sunk to an object near 4 K to remove the heat transferred through the wires from room temperature. Base head plate 110 is cooled by being attached to plate 102 via high purity copper foils or wires. Plate 102 is then connected via a copper mass to a closed cycle cooler or a liquid helium bath. Electrical wires 114 are connected to connectors on the circuit board 117, which contact a sapphire plate (not shown). The sapphire plate is beneath the circuit board 117 and at 4 K, the sapphire plate provides thermal conductivity but is an electrical insulator. The wires 114 then connect to the connectors 115 and onto the other components of the MRFM apparatus 100. In another exemplary embodiment, a metal block and two screws are used to compress the circuit board 117 to the sapphire (not shown) to the base plate 102.

Figure 2:
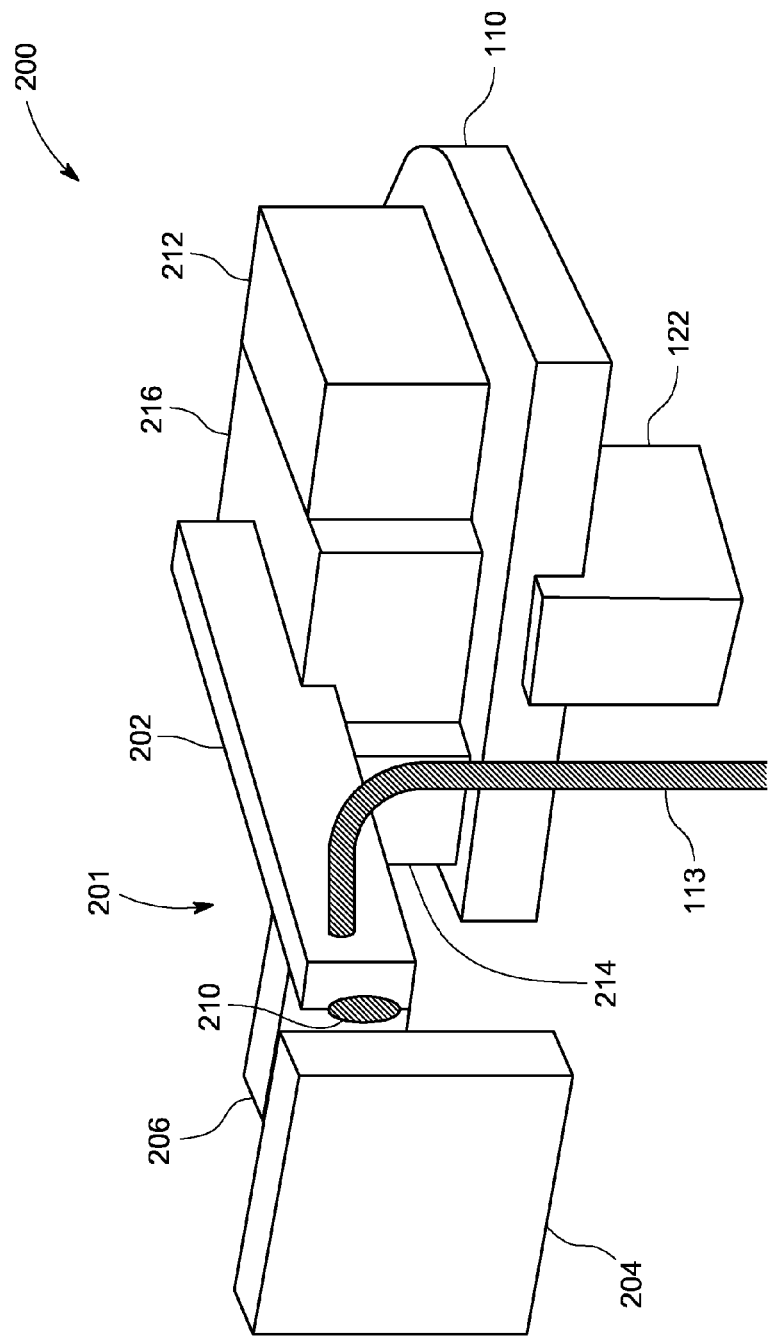
FIG. 2 is an illustration of a probe head attached to the probe head plate in the MRFM apparatus.

FIG. 2 is an illustration of the components of a probe head 200 attached to the probe head plate 110 in the MRFM apparatus 100 in accordance with exemplary embodiments of the present invention. The components are mounted upon the base head plate 110 of FIG. 1. In an exemplary embodiment, the components of the probe head 200 comprise a magnetic sensor 201 (not shown), an RF antenna 206, an optical fiber positioning mechanism 212, an RF antenna positioning mechanism 214, and an immobile clamp 216. The sample positioning stage 122 is for positioning the sample 204 in physical space. The magnetic sensor 201, the fiber 113, the sample 204 and the RF antenna 206 must be positioned with respect to each other in the present invention as disclosed in related U.S. patent application Ser. No. 13/361,056 filed Jan. 30, 2012, hereby incorporated by reference in its entirety. In an exemplary embodiment of the present invention, under operating conditions the optical fiber 113, the magnetic sensor 201 and the RF antenna 206 are fixed with respect to each other. The magnet sensor 201 comprises a cantilever 202 tipped with a magnetic particle 210. The optical fiber positioning mechanism 212, the magnetic sensor positioning mechanism 216 and the RF antenna positioning mechanism 214 are positionable in three-dimensions of physical space. In exemplary embodiments, the optical fiber positioning mechanisms 212 and the RF antenna positioning mechanism 214 are in direct contact with the optical fiber 113 and the RF antenna 206 through a complex finger mechanism (not shown for purposes of clarity). The sample positioning stage 122 moves the sample in three-dimensions, working at 4 Kelvin in a vacuum and in high magnetic fields; thus, the stage 122 allows the probe head to scan arbitrarily sized samples.

According to an exemplary embodiment of the present invention, the magnetic particle 210 at the tip of the cantilever 202 is made of, for example, cobalt, nickel, or similar metal. The magnetic sensor 201 is brought close to the sample 204, while the entire apparatus 100 is immersed in a background magnetic field. The magnetic field causes the magnetic moments (electrons or nuclear magnetic moments) of the sample 204 to attract the particle 210 and the magnetic sensor 201 to bend. A magnetic field from the RF antenna 206 is then applied causing the direction of the spin in the electrons of the sample to reverse, pushing the magnetic sensor 201 in an opposing direction.

The background magnetic field sets a uniform magnetic field over the sample 204 and the magnetic particle 210 modifies this field. The sample 204 is exposed to RF signals from the RF antenna 206, causing only the particles in resonance with the RF magnetic field to reverse their spin directions. According to an exemplary embodiment, the RF signal generated by the RF antenna 206 is 50 MHz to 380 MHz. In an exemplary embodiment, the geometry of the RF antenna is disclosed in commonly assigned U.S. patent application Ser. No. 13/361,056. Therefore, there is a bowl-shaped slice through the sample in which the particles of the sample 204 flip directions. As the positioning of the sample 204 is modified in three-dimensions, an image is reconstructed using the readings from all the slices. An interferometer comprised of an optical fiber 113, measures small displacements in the cantilever 202.

Figure 3:
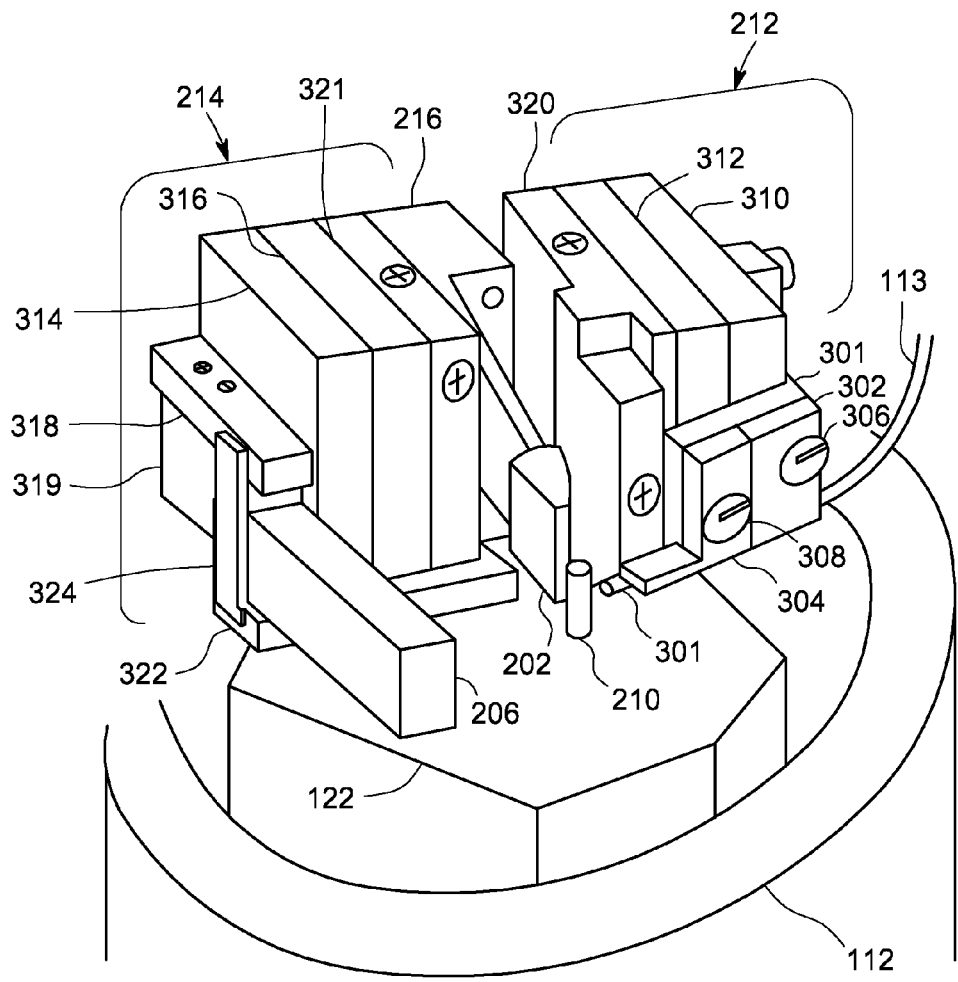
FIG. 3 is a more detailed illustration of the central components to the microscope MRFM apparatus shown in FIGS. 1 and 2 shown from a different perspective view, in accordance with exemplary embodiments of the present invention.

FIG. 3 is a more detailed illustration of the central components to the MRFM apparatus 100 shown in FIGS. 1 and 2 shown from a different perspective view. The positioning mechanisms 214 and 212 are shown in further detail and the position of the components above the sample stage Attocube® stack 122 contained in the cylinder 112 are shown. In an exemplary embodiment, as disclosed in related U.S. patent application Ser. No. 13/361,145 filed Jan. 30, 2012, optical fiber 113 positioning mechanism 212 is comprised of two plates 310 and 312 along with plates 302 and 304 secured by screws 306 and 308, which strip the jacket of optical fiber 113 such that the end of the optical fiber 113 is directly exposed to the cantilever 202 (not shown). In this configuration, the optical fiber 113 emits light hitting the cantilever 202 at a desired location and bounce directly back into the end of the optical fiber 113. The mechanism 212 permits the optical fiber to have two-dimensional freedom. In other exemplary embodiments, the two plates are clamped together, in which case an external positioning system is required to position the optical fiber 113 in its final location proximate the cantilever 202.

Plate 304 clamps the unjacketed (bare) optical fiber 113 against plate 301 using screw 308 to hold them together. Plate 302 clamps the fiber jacket against plate 301 coupled by screw 306. In this configuration, any forces or torque applied to the optical fiber 113 is applied to the jacket of the optical fiber 113, which is significantly more robust than glass fiber, making it more difficult to break the glass fiber while handling the MRFM apparatus 100. The cantilever positioning mechanism 216 holds the cantilever 202 in position, attached by screws (not shown) to the immovable base 320 attached to base plate 110. Optionally the cantilever positioning mechanism 216 incorporates a handle making for convenience in mounting and dismounting the cantilever and inserting and removing the cantilever in and out of the probe head 200.

The RF antenna positioning mechanism 214 for the RF antenna 206 is implemented as a mechanism comprised of plates 314 and 316, plate 318 attached to plate 319 which is attached to plate 314 in accordance with an exemplary embodiment of the present invention. In an exemplary embodiment, the RF antenna positioning mechanism 214 is a mirror image of the optical fiber positioning mechanism 212. In other embodiments, the RF antenna positioning mechanism 214 is different from the optical fiber positioning mechanism 212. Plate 321 is a mechanical ground for the mechanism 214. Plate 321 is attached to the base plate 110 via screws or other attachment mechanisms, though in other embodiments, plate 321 is integrated with base plate 110 as one plate. Plate 314 and 316 form the mechanism for two-dimensional positioning. In other embodiments, the plates 314 and 316 are replaced with a 2D or 3D Attocube®. Plate 318 is attached directly to plate 319 using screws or other attachment mechanisms. Plate 318 and plate 322 clamp plate 324 in place. Plate 324 is a mechanical ground for the RF antenna 206. The RF antenna 206 is attached to the mechanical ground 324 and the RF antenna position is modified by various screws used to regulate the mechanism 214. As discussed above, plate 314 and plate 316 allow RF antenna 206 to be modified in two dimensions and plate 324 slides between plates 318 and 322 providing for the third axis of adjustment for RF antenna 206. Optionally, an external clamp and mechanical adjustment stage is used to position the RF antenna 206 for greater precision or safety, i.e., to avoid collision with the cantilever 202 or the optical fiber 113. As described in related U.S. patent application Ser. No. 13/361, 145, mechanical ground 324 thermally isolates the heat from the RF antenna 206 out of the rest of the probe head 200.

Figure 4:
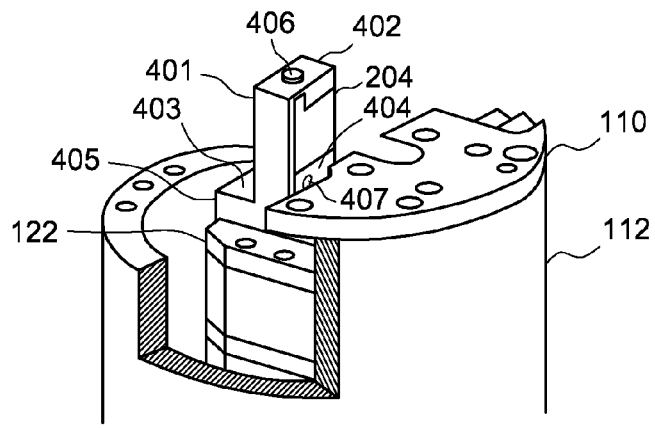
FIG. 4 is an illustration showing the sample stage and the sample stage position measurement apparatus for a sample in accordance with exemplary embodiments of the present invention.

FIG. 4 is an illustration showing the sample stage 410 for sample 204. The sample stage thermometer 401, mounted on the top of the back of the sample stage base 405, is used to measure the temperature of the sample stage 405. The sample stage heater 403, on the bottom back of 405 is attached to the back of the sample stage base 405 near the lower portion of the base 405. There are no thermal links to the vertical portion of the sample stage base 405. This allows for accurate measure of the temperature of the vertical plate portion of the sample stage base 405 to which the sample 204 is attached since the heat from the vertical plate can only pass down and out of the sample stage base 405 bottom past the thermometer 401. Clamp 402 using screw 406 and clamp 404 using screw 407 secures the sample 204 in place and clamps the sample 204 to the sample stage base 405. The sample stage base 405 is attached to the Attocube® stack 122.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in associated with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. An apparatus for performing magnetic resonance force microscopy on one or more samples of arbitrary size comprising:
    a base plate for mounting components;
    one or more heat sink plates coupled to the base plate;
    one or more suspension mechanisms mounted on the base plate and the heat sink plates;
    a probe head suspended from the one or more suspension mechanisms for scanning the one or more samples; and
    a sample cylinder comprising a sample stage coupled to the probe head for sample positioning and an outer drum for isolating the sample stage from an external environment.

2. The apparatus of claim 1 wherein the probe head further comprises:
    a probe head plate for mounting components;
    a radio-frequency antenna, coupled to the probe head plate, for sending and generating magnetic field in the sample;
    a cantilever, coupled to the probe head plate, for positioning a particle close to the one or more samples; and
    an optical fiber positioning mechanism coupled to the probe head plate for positioning an optical fiber used for emitting light and capturing deflected light from the cantilever.

3. The apparatus of claim 2 further comprising:
    a radio frequency antenna positioning mechanism for positioning the RF antenna in two dimensions; and
    a cantilever positioning mechanism for positioning the cantilever.

4. The apparatus of claim 3 wherein the RF antenna positioning mechanism and the optical fiber positioning mechanism are mechanisms providing for two-dimensional positioning of the RF antenna and the optical fiber, respectively.

5. The apparatus of claim 2 further comprising a sample stage thermometer for measuring the temperature of the sample.

6. The apparatus of claim 2, wherein the apparatus further comprises one or more thermal routes out of the probe head to the base plate, for transferring heat from the probe head, wherein a first of the one or more thermal routes isolates the heat from the RF antenna and a second and third thermal route of the one or more thermal routes isolates heat from the rest of the probe head.

7. The apparatus of claim 6, wherein the one or more thermal routes are coupled to an upper circuit board for harnessing electrical wires to the probe head, and wherein the thermal routes are made of sapphire and the sapphire comes into contact with the electrical wires where the electrical wires contact the upper circuit board.

8. The apparatus of claim 7, wherein the cylinder is coupled to a base plate further coupled to a lower circuit board with electrical contacts, and the lower circuit board is coupled to the upper circuit board, electrically, through tubing for holding the electrical wires.

9. The apparatus of claim 1 wherein the suspension mechanisms are springs.

10. The apparatus of claim 9 wherein where there is an interface material where the springs meet the base plate for preventing vibration from transferring from the base plate to the springs.

11. The apparatus of claim 10 wherein the interface material is one of polyethylene rods or polyethylene strings.

12. The apparatus of claim 1 wherein the sample stage has controls for positioning the sample in three dimensions.

13. The apparatus of claim 1 further comprising an electrical plate with electrical connectors for removeably coupling and decoupling the probe head from the base plate, where the electrical connectors couple with electrical wires for powering components of the probe head.

14. A method for removeably coupling and decoupling a probe head from an apparatus for performing magnetic resonance force microscopy on one or more samples of arbitrary size comprising:
  a base plate for mounting components;
  one or more heat sink plates coupled to the base plate;
  one or more suspension mechanisms mounted on the base plate and the heat sink plates;
  a probe head suspended from the one or more suspension mechanisms for scanning the one or more samples;
  a sample cylinder comprising a sample stage coupled to the probe head for sample positioning and an outer drum for isolating the sample stage from an external environment; and
  an electrical plate with electrical connectors for removeably coupling and decoupling the probe head from the base plate, where the electrical connectors couple with electrical wires for powering components of the probe head,
the method comprising:
  coupling or decoupling the probe head from the apparatus.

* * * * *